Patented Dec. 15, 1953

2,662,840

UNITED STATES PATENT OFFICE 2,662,840

SOLDER FLUX LIFE EXTENDER

William C. Shilling, Arlington, and George W. Wright, Wellesley Hills, Mass., assignors to Dewey and Almy Chemical Company, Cambridge, Mass., a corporation of Massachusetts No Drawing. Application February 19, 1953, Serial No. 337,872

8 Claims. (Cl. 148—23)

This invention is concerned with a solder flux adapted to be used in molten condition on a solder bath and is especially adapted for use on the soldering baths of sanitary can body makers, particularly when solders of low tin content are used.

While this improved solder flux is not restricted in usefulness merely to such body makers, but is equally useful in any operation involving a solder bath, it was developed with the particular problem of the body making operation in mind and will, therefore, be described in connection with this operation.

Sanitary can bodies are customarily made by bending back the two opposing margins of preformed sheet metal blanks, upwardly on one edge, downwardly on the other, to form the so-called "body hooks." In the body maker, the hooks are interlocked and flattened by bumping. Molten solder is then flowed into the interlocked seam by scraping the seam over a roll which rotates in a bath of molten solder. In order that the solder remain fluid until the moment at which capillarity has drawn enough solder into the seam to flood it, it is necessary that the solder in the bath be maintained at a temperature considerably in excess of its melting point.

Over the years, can makers have used a tin-lead solder having a tin content of from 38 to 50% by weight and from experience have found that zinc-ammonium chloride fluxes were the most satisfactory for use in protecting the molten solder in the solder bath and for cleaning the surface of the roll.

In recent years, the shortage of tin has forced can makers to use tin-lead solders with greatly reduced amounts of tin. Present regulations limit the maximum amount of tin in such a solder to 5%. Today, 3–97 and 2–98 solders (3 or 2% tin; 97 or 98% lead) are widely used. It now appears that even in the absence of regulation, low tin content solders will continue to be used, at least in the can making industry, since it has been found that such a solder permits body makers to be operated at higher speeds, and further that such a solder is less liable to crystallize in the side seam lap of the can upon prolonged storage.

However, the use of a low tin content solder greatly increases the consumption of flux. The reason for this is that while 50–50 solder has a melting point of about 215° C. (420° F.), 3–97 solder, for example, has a melting point of about 320° C. (610° F.). To obtain proper operation of the body maker using such a solder, it is therefore, necessary to maintain the solder bath at a temperature of 370–400° C. (700–750° F.). At this temperature, the ammonium chloride portion of the complex sublimes rapidly.

Since the ammonium chloride is the more active fluxing ingredient, this loss of ammonium chloride greatly reduces the active life of the flux. With the loss of ammonium chloride, the fluxing efficiency falls off, and ultimately when the proportion of ammonium chloride becomes too low, the flux must be discarded since the solder no longer will wet or follow the roll. In addition, the constant liberation of ammonium chloride is very annoying to any personnel working in the vicinity of the body maker.

We have discovered that if the flux is absorbed by a body of inert, low density, granular particles, the ammonium chloride leaves the mixture reluctantly. As a result, significantly more ammonium chloride will be found in the flux after a given time, and the flux will under identical conditions have a longer life than does the same flux without the absorbent.

We apply this discovery to a flux for a roll solder bath by making a mixture of zinc chloride and ammonium chloride (or zinc ammonium chloride) and adding low density granules of an inert siliceous material as the absorber. We have found expanded siliceous material such as exfoliated vermiculite, "popped" silicates as typified by expanded perlite (an acidic volcanic glass), and sintered, spherulized clay particles to be suitable for use as the low density granules. Other inert, highly porous, siliceous materials, for example, expanded blast furnace slag and expanded shale, appear to be useful, but may contain so much iron that their use is not advised. It will be recognized that these materials are the common low weight aggregates used in plaster and masonry. The "popped" aggregates are made by passing small granules of naturally occurring siliceous rocks (usually perlite) through an intensely hot furnace zone where the grain is disrupted and the apparent density of the rock falls to about 8 lbs. per cubic foot. Spherulized clay is made by spherulizing a clay slurry containing an expanding agent. The spherules are then passed into a furnace, where the surface of the spherule is sintered by the heat, and a hollow tiny sphere is formed by the generation of steam and gas within the spherule. Such a spherulized clay is supplied by the Kanium Corporation under the trade-mark "Kanamite."

As the chlorides in the flux melt, they wet the absorber and a floating mass forms above the surface of the solder which has the curious combined property of cohesiveness and mobility. When the chlorides are completely melted, the mass cannot be described as a paste: it is far too mobile. It is not a liquid, for when the proportions are those which give the longest life, some liquid is visible, but most of the chloride is held in the pores and on the surface of the siliceous absorbent. The mass is cohesive in the sense that the rotating roll does not break or scatter it. It lies against the roll surface wicking flux to the solder film, smoking mildly for several hours before it finally becomes spent and breaks away from the roll. Then it must be discarded, since it will no longer keep the roll tinned.

Although we have conducted numerous experiments seeking confirmation of various hypotheses which would explain the marked increase in flux life, we do not have a satisfactory explanation. Detectable increase in the life of the flux takes place upon the addition of seemingly negligible weight per cents of the siliceous ingredient, but the great difference in apparent density between the melted flux and the expanded siliceous absorber should be kept in mind. For example, the additive calculated density of a typical melted flux is approximately 2.18 gm./cc., and the bulk density of expanded perlite is approximately 0.12 gm./cc. Thus, 3 per cent by weight of expanded perlite represents 37% of the mixture by volume after the flux has melted. A commercially valuable increase in flux life is secured when the amount of the expanded material to the initial weight of the zinc and ammonium chlorides reaches 1.5%. The upper limit is variable depending upon the absorber, but it is a bit more than the amount which absorbs the entire mass of flux. Noticeable quantities of flux should be left on the surface of the granules, but it is not necessary that flux occupy the intervening spaces between the granules. Generally speaking, this upper limit, expressed as a volume ratio, will be found to lie between 2 and 3 volumes of siliceous material to each volume occupied by the flux in its molten condition.

We have also found that it is advantageous to include a very small proportion of resin, preferably in the range of 0.1 to 1 part by weight of the flux. Resin is not necessary, but if used it increases the life of the flux. An essential property of the resin is that it melts before it begins to decompose upon being heated to fluxing temperature so that it forms a scum on the surface of the flux before it hardens and carbonizes. The scum at the temperature of the solder bath is partly liquid, but is largely wet, carbonized, extremely small resin particles. We believe that the scum makes the flux mass more impermeable to air and that possibly it imposes an additional restraint on the escape of ammonium chloride vapor. For reasons of effectiveness, availability and low cost, we prefer the gasoline-insoluble resin obtained from the extraction of pine wood in aromatic solvents; the hard, dark-colored, partially gasoline-soluble fraction obtained as a by-product in the manufacture of F. F. wood rosin; and the so-called "modified" resoles of the phenol-formaldehyde condensation type.

The zinc chloride and ammonium chloride may be combined in varying proportions according to the known art. If the mixture is very high in ammonium chloride, it will not melt until the percentage of ammonium chloride to total zinc chloride plus ammonium chloride falls below about 44%. Nevertheless, the unmelted mixture of chlorides and absorber will keep the roll tinned if the mixture is stirred, say, at 10 minute intervals until the proportion of ammonium chloride falls below 44%. When the chlorides melt, the flux runs for hours without attention. We prefer, in consequence, to use initial ratios of chlorides which melt reasonably promptly. The flux mixture may also include minor proportions of other materials known to modify the properties of the flux. For example, the alkali metal chlorides may be added for melt temperature adjustment. Additionally, zinc oxide or zinc carbonate may be added to prevent caking and the release of acid fumes as disclosed in Carey U. S. Patent 2,327,958. Zinc chloride, ammonium chloride, $ZnCl_2 \cdot 2NH_4Cl$ and $ZnCl_2 \cdot 3NH_4Cl$ may be used. We have, as the result of many tests, determined that our invention increases the life of all such fluxes of the zinc chloride and ammonium chloride type.

We prefer when preparing the improved flux to mix the dry ingredients in a dry mixer until a uniform distribution of the ingredients is secured. When very small quantities of resin are used, it is helpful, but not necessary, first to mix the resin with a small proportion of another ingredient, then add this mixture to the main batch. A flux made in this manner may be used on the solder bath as received except when vermiculite is a component of the flux. Since vermiculite tends to separate in shipment, a package of such a flux mixture should be mixed, as by tumbling, before the flux is used. However, while we prefer to prepare the flux mixture in this manner, the absorber may be added to the flux at any time with equally satisfactory results.

In order to make a comparative determination of the increase in fluxing efficiency due to the addition of an inert, low-density siliceous material as an absorber and also due to the further addition of a suitable resin to typical high temperature fluxes, a series of tests were made on an experimental roll solder bath. This experimental solder bath was designed to be the same as the solder baths actually used in body making machines except that it has a roll of shorter length. It comprises a gas-heated iron tank 10 inches long, 6¼ inches wide and 4 inches deep, in which a solder roll 4 inches in diameter and 6 inches in length is mounted across the tank at a point equidistant between the ends and 2½ inches from the bottom. The roll has a cylindrical working surface 4½ inches long terminating in a $\frac{1}{16}$ inch radius at each end. The bath is filled with sufficient 3–97 solder to raise the solder level to the center line of the roll (approximately 35 pounds). In each test, the temperature of the solder in the bath was thermostatically maintained at a temperature of 750±2° F., and the roll rotated at a speed of 120 R. P. M. Three hundred grams of the flux were placed on the surface of the solder on the side of the bath where the roll re-enters. The area covered by flux measures 3 by 6 inches. In each case the life of the flux was determined by measuring the time until noticeable areas on the cylindrical surface of the roll failed to be wetted by the solder. The test results were reproduceable to plus or minus fifteen minutes and correlated almost exactly with flux lives determined under similar conditions on operating body makers.

With this apparatus and this procedure, the following test series was run to determine the effect of increasing additions of a typical siliceous material and also of a typical resin to a typical high temperature flux.

Test A

| | Parts by weight |
|---|---|
| $ZnCl_2 \cdot 2NH_4Cl$ | 91 |
| $ZnO$ | 6 |

Flux life: 106 minutes.

Test B

| | Parts by weight |
|---|---|
| $ZnCl_2 \cdot 2NH_4Cl$ | 91 |
| $ZnO$ | 6 |
| Expanded Perlite | 1½ |

Flux life: 181 minutes.

Test C

| | Parts by weight |
|---|---|
| $ZnCl_2 \cdot 2NH_4Cl$ | 91 |
| $ZnO$ | 6 |
| Expanded Perlite | 3 |

Flux life: 235 minutes.

Test D

| | Parts by weight |
|---|---|
| $ZnCl_2 \cdot 2NH_4Cl$ | 91 |
| $ZnO$ | 6 |
| Expanded Perlite | 6.2 |

Flux life: 350 minutes.

Test E

| | Parts by weight |
|---|---|
| $ZnCl_2 \cdot 2NH_4Cl$ | 91 |
| $ZnO$ | 6 |
| Expanded Perlite | 9.6 |

Flux life: 570 minutes.

Test F

| | Parts by weight |
|---|---|
| $ZnCl_2 \cdot 2NH_4Cl$ | 91 |
| $ZnO$ | 6 |
| Expanded Perlite | 3 |
| Phenol-formaldehyde resin | 0.12 |

Flux life: 300 minutes.

Test G

| | Parts by weight |
|---|---|
| $ZnCl_2 \cdot 2NH_4Cl$ | 91 |
| $ZnO$ | 6 |
| Expanded Perlite | 3 |
| Phenol-formaldehyde resin | 0.5 |

Flux life: 345 minutes.

Test H

| | Parts by weight |
|---|---|
| $ZnCl_2 \cdot 2NH_4Cl$ | 91 |
| $ZnO$ | 6 |
| Expanded Perlite | 3 |
| Phenol-formaldehyde resin | 1 |

Flux life: 435 minutes.

In order to ascertain the effect of the addition of low weight siliceous material in the conservation of the ammonium chloride content of the flux, small quantities of flux were withdrawn from the flux composition of Test A and Test E at periodic intervals. The per cent ammonium chloride remaining in each sample was determined to be as follows:

| Time in hours | Percent ammonium chloride | |
|---|---|---|
| | Test A | Test E |
| 1 | 15.0 | 23.6 |
| 1.7 | 7.7 | |
| 2 | | 17.6 |
| 3 | | 13.4 |
| 4 | | 11.2 |

The determination for the flux of Test A at 1.7 hours represents the amount of ammonium chloride remaining in a flux at the point where the flux loses its fluxing power and is no longer capable of maintaining a well tinned roll.

The maximum quantity of absorber which may be added to a flux to make an operable flux composition varies with the physical nature of the absorber. The properties of the absorber which appear to be of importance in this respect are the bulk density of a mass of the absorber and the porosity and shape of the individual particles. While we prefer to use absorbers with a minimum bulk density since by so doing, maximum effectiveness is obtained with a minimum added weight of absorber, any particulate absorber which is inert and buoyant in molten flux would appear to be useful.

Porosity and shape of the individual particle is of importance since an essential attribute of the flux composition is that it be mobile once the flux component of the composition has liquefied. Normally, the composition will be mobile so long as noticeable quantities of flux still appear on the surface of the individual absorber particles, although it is not necessary that the space between the particles be occupied by flux. However, if the absorber particles have a surface configuration such that an appreciable binding between particles results, the maximum quantity of absorber which will result in an operable composition is thereby reduced. Since a nonporous particle will potentially displace its own volume of molten flux, a greater quantity may be added to the composition than in the case of a particle which may absorb some flux within its body.

The effect of these characteristics may be seen when the three preferred absorbers disclosed herein are compared. Exfoliated vermiculite has a bulk density of 0.10 to 0.13 gram per cubic centimeter. In addition, the vermiculite particles have a platelike structure which is highly porous and which results in a slight degree of binding between particles. For these reasons, the maximum quantity of vermiculite which may be added to a flux and still give a workable flux composition is only about 12%.

Expanded perlite has a comparable, low density of 0.12 to 0.19 gram per cubic centimeter. The individual particles have almost as much absorbency as vermiculite, but being quite spherical in configuration, they are subject to a much lower degree of binding. The upper limit of perlite addition is, therefore, about 16 or 17%.

Spherulized clay (Kanamite) particles, on the other hand, are almost perfect spheres with a bulk density of 0.4 to 0.6 gram per cubic centimeter. Since these particles are individually nonporous and are subject to no binding whatsoever, the maximum quantity of these particles which may be added to a flux is so high that it has never been determined. In one experiment, more than 60% by weight of these particles were added to a molten flux with no adverse effects except that the flux composition overflowed the solder bath because of the added bulk. Even after this high addition of absorber, the composition remained mobile. There is, however, a much lower practical limit for the addition of spherulized clay. As can be seen from the following table of examples, the maximum effectiveness is reached at less than a 20% addition. In addition, if more than about 30% is added initially to an otherwise quickly melting flux, the melting rate of that flux is reduced to an unworkable degree.

It is to be noted that the maximum efficiency is obtained when the addition of absorber to the fusible ingredients of the flux composition is somewhat lower than the maximum addition as outlined above. Since an absorber in which the individual particles are not porous is as useful as one in which the particles are somewhat porous, it is obvious that the effectiveness of the absorber in increasing the life of the flux is due primarily to the absorbency of the entire mass of particles. The particle size range of the absorber particles does not appear to be critical provided the maximum average particle size does not exceed about 10 mesh.

Various embodiments of the present invention are presented by way of example by the following table. In each case, the flux life was determined at a solder bath temperature of 750° F.

*Examples*

| Example | Parts by weight | | | | | | | | | | | Flux life, minutes |
|---|---|---|---|---|---|---|---|---|---|---|---|---|
| | Flux | | | | | Absorber | | | Resin | | | |
| | $ZnCl_2$ | $NH_4Cl$ | $ZnCl_2 \cdot 2NH_4Cl$ | $ZnCl_2 \cdot 3NH_4Cl$ | ZnO | Expanded perlite | Exfoliated vermiculite | Spherulized clay | Modified resole of the phenol-formaldehyde type | Gasoline insoluble resin obtained from the extraction of pine wood in aromatics | Partially gasoline soluble fraction obtained as by-product in the manufacture of F. F. wood rosin | |
| 1 | | | 91 | | 6 | 3 | | | 0.5 | | | 345 |
| 2 | | | 91 | | 6 | | | 11 | | | 1 | 540 |
| 3 | 55 | 36 | | | | | 6 | 3.1 | | | | 450 |
| 4 | | 3.6 | 84.7 | | 8.6 | | | | 0.12 | | | 270 |
| 5 | | 16.0 | 75.4 | | 5.4 | 3.1 | | | 0.12 | | | 360 |
| 6 | | | 46.2 | 46.2 | 6 | 1.5 | | | | 20 | | 250 |
| 7 | | | 91 | | 6 | | 15.5 | | | | | 460 |
| 8 | | | 91 | | 6 | | | 10 | | | | 605 |
| 9 | | | 91 | | 6 | 3 | | | | | | 225 |
| 10 | | | 91 | | 6 | | | | | | 1 | 350 |

We claim:

1. A solder flux of the zinc-ammonium chloride type especially adapted for use on a roll solder bath, said flux containing a flux life extender consisting of a mass of individual particles of an inert, low-density, heat expanded siliceous material in the proportion of at least 1½% by weight of the fusible flux ingredients.

2. The flux described in claim 1 containing between 0.1 and 1.0 part by weight of a resin which melts before it decomposes upon being heated to fluxing temperature.

3. The flux described in claim 2 in which the resin is selected from the class consisting of the gasoline-insoluble resin obtained from the extraction of pine wood in aromatic solvents; the hard, dark-colored, partially gasoline-insoluble resin obtained as a by-product in the manufacture of F. F. wood rosin and the modified phenol-formaldehyde condensation resoles.

4. A solder flux of the zinc-ammonium chloride type especially adapted for use on a roll solder bath, said flux containing a flux life extender consisting of a mass of individual particles of an inert, low-density, heat expanded siliceous material in the proportion of at least 1½% by weight of the fusible flux ingredients and not in excess of that amount at which a film of flux remains visible on the surface of the individual particles of the mass.

5. The flux described in claim 4 in which the flux life extender consists of a mass of individual particles of an inert, low-density, heat expanded siliceous material selected from the class consisting of expanded perlite, exfoliated vermiculite and spherulized clay.

6. The flux described in claim 5 in which the flux life extender consists of a mass of individual particles of expanded perlite not in excess of 16% by weight of the fusible flux ingredients.

7. The flux described in claim 5 in which the flux life extender consists of a mass of individual particles of exfoliated vermiculite not in excess of 12% by weight of the fusible flux ingredients.

8. The flux described in claim 5 in which the flux life extender consists of a mass of individual particles of spherulized clay.

WILLIAM C. SHILLING.
GEORGE W. WRIGHT.

References Cited in the file of this patent
UNITED STATES PATENTS

| Number | Name | Date |
|---|---|---|
| 1,719,512 | Krembs | July 2, 1929 |
| 1,776,852 | Finkbone | Sept. 30, 1930 |
| 2,311,669 | Kepfer | Feb. 23, 1943 |